(12) United States Patent
Even

(10) Patent No.: US 8,619,599 B1
(45) Date of Patent: Dec. 31, 2013

(54) PACKET PROCESSOR VERIFICATION METHODS AND SYSTEMS

(75) Inventor: Vladimir Even, Givataim (IL)

(73) Assignee: Marvell International Ltd., Hamilton (BM)

( * ) Notice: Subject to any disclaimer, the term of this patent is extended or adjusted under 35 U.S.C. 154(b) by 119 days.

(21) Appl. No.: 13/231,487

(22) Filed: Sep. 13, 2011

Related U.S. Application Data

(60) Provisional application No. 61/405,106, filed on Oct. 20, 2010, provisional application No. 61/384,069, filed on Sep. 17, 2010.

(51) Int. Cl.
| | |
|---|---|
| *G01R 31/08* | (2006.01) |
| *G01R 31/28* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ........... 370/249; 370/242; 370/244; 370/248; 714/30; 714/31; 714/715; 714/716

(58) Field of Classification Search
USPC .............. 370/242, 244, 248, 249; 702/57–59, 702/81–82, 124–126, 182–183, 184, 189; 714/30, 31, 715, 716
See application file for complete search history.

(56) References Cited

U.S. PATENT DOCUMENTS

| | | | |
|---|---|---|---|
| 7,111,208 B2 * | 9/2006 | Hoang et al. .................. | 714/716 |
| 2004/0015616 A1 * | 1/2004 | Chen .................................. | 710/1 |
| 2010/0027536 A1 * | 2/2010 | Jorgens et al. ................ | 370/389 |

* cited by examiner

*Primary Examiner* — Benjamin H Elliott, IV

(57) ABSTRACT

Methods and systems for implementing self-testing of packet processing devices are disclosed. For example, a packet-processing device can include a plurality of ports having a receive media access controller (RX MAC) and a transmit media access controller (TX MAC). The TX MAC of a first port is selectably configurable to loop back packets to its respective RX MAC during the self-testing. The packet-processing device can further include a switching engine configured to provide a test packet received from a packet generator to the TX MAC of the first port, and route to the TX MAC of one or more second ports at least the test packet received from the RX MAC of the first port, or a copy of the received test packet, after the received test packet or its copy has been looped-back one or more times between the TX MAC and the RX MAC of the first port.

20 Claims, 7 Drawing Sheets

PACKET PROCESSOR VERIFICATION METHODS AND SYSTEMS

INCORPORATION BY REFERENCE

This application claims the benefit of U.S. Provisional Application No. 61/405,106 entitled "AUTOMATIC FUNCTIONAL VERIFICATION APPROACH OF NETWORKING SOFTWARE APPLICATION AND PACKET PROCESSOR WITHOUT EXTERNAL TRAFFIC GENERATOR EQUIPMENT" filed on Oct. 20, 2010, the content of which is incorporated herein by reference in its entirety. This application also claims the benefit of U.S. Provisional Application No. 61/384,069 entitled "AUTOMATIC FUNCTIONAL VERIFICATION APPROACH OF NETWORKING SOFTWARE APPLICATION AND PACKET PROCESSOR WITHOUT EXTERNAL TRAFFIC GENERATOR EQUIPMENT" filed on Sep. 17, 2010, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Packet-processing devices, such as Ethernet routers and switches, play an important role in computer networking systems. Generally, every packet-processing device is thoroughly tested before being sold and deployed. The testing of packet-processing devices can involve lengthy testing programs using sometimes elaborate and expensive test equipment, which in turn can add significantly to the final cost of production.

SUMMARY

Various aspects and embodiments of the invention are described in further detail below.

In an embodiment, a packet-processing device includes a plurality of ports having a receive media access controller (RX MAC) and a transmit media access controller (TX MAC), wherein the TX MAC of a first port is selectably configurable to loop back packets to its respective RX MAC during a self-testing operation of the packet processing device. The packet-processing device further includes a switching engine coupled to the plurality of ports, the switching engine being configured to provide a test packet received from a packet generator to the TX MAC of the first port, and route to the TX MAC of one or more second ports at least the test packet received from the RX MAC of the first port, or a copy of the received test packet, after the received test packet or its copy has been looped-back one or more times between the TX MAC and the RX MAC of the first port.

In another embodiment, a method for testing a packet-processor that includes a plurality of ports having a receive media access controller (RX MAC) and a transmit media access controller (TX MAC) is disclosed. The method includes sending a test packet to the TX MAC of a first port, looping-back the test packet from the TX MAC of the first port to the RX MAC of the first port, receiving the looped-back test packet from the RX MAC of the first port, and routing the received looped-back test packet to a TX MAC of one or more other ports of the packet-processor.

in yet another embodiment, a chipset for implementing a packet-processing apparatus configured to perform self-testing includes one or more integrated circuits that include a plurality of ports having a receive media access controller (RX MAC) and a transmit media access controller (TX MAC), wherein the TX MAC of a first port is selectably configurable to loop back packets to its respective RX MAC during a self-testing operation of the packet processing apparatus. The one or more integrated circuits also includes a switching engine coupled to the plurality of ports, the switching engine being configured to provide a test packet received from a packet generator to the TX MAC of the first port, and route to the TX MAC of one or more second ports at least the test packet received from the RX MAC of the first port, or a copy of the received test packet, after the received test packet or its copy has been looped-back one or more times between the TX MAC and the RX MAC of the first port.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

The following disclosure allows for packet processing devices to perform most of standard functionality testing with only minimal external equipment, such as traffic generators and packet analyzers, as the tested device itself is used to perform those functions. The packet processing devices (with embedded self-testing) described below may be used to conduct a broad range of different tests, for example, robust suites of tests to individual tests targeted at specific hardware of interest.

For the purpose of this disclosure, the terms "packet-processing device" or "packet-processing apparatus" is to be construed broadly to encompass any device having specialized hardware capable of receiving and transmitting packets. Such devices include, but are not limited to, network switches, network routers and network bridges. While an Ethernet device is used for the purpose of providing an example below, it is noted that the terms "packet-processing device" or "packet-processing apparatus" may encompass any other known or later developed networking technology.

Figure 1:
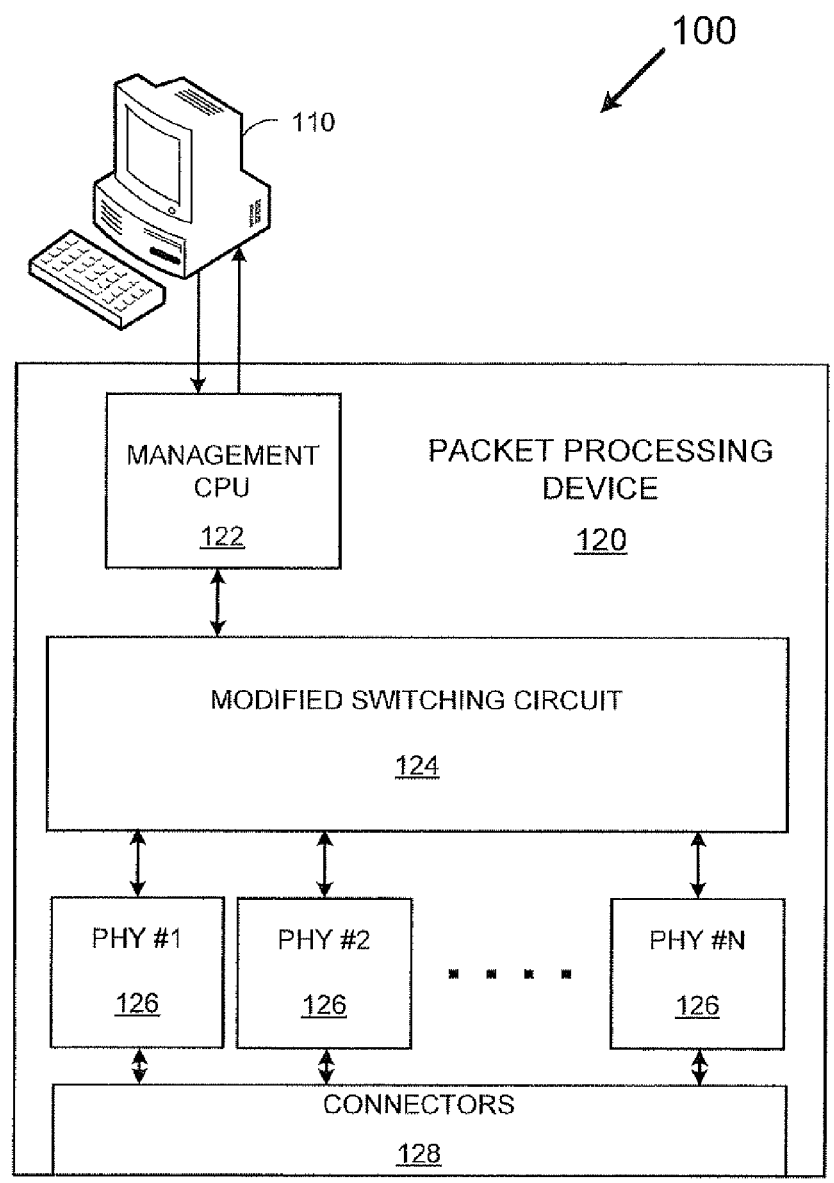
FIG. 1 is a packet-processing device under test using an example testing method.

FIG. 1 is a test system 100 that includes a computer 110 and a packet-processing device 120, which for the present example is an Ethernet router, in accordance with an embodiment of the present disclosure. The packet-processing device 120 includes a Management CPU 122, a modified switching circuit 124, a plurality of physical interface devices 126 (commonly known as "PHYs"), and a set of connectors 128.

Although the example computer 110 is depicted as a personal computer having a screen and keyboard, it is noted that the computer 100 may take a variety of other forms such as a server, a mainframe computer, or any other processor-based device containing one or more central processing units and memory.

In operation, the computer 110 initializes the packet-processing device 120 (via Management CPU 122) through a series of commands to enter into any number of test modes. That is, the computer 110 chooses test modes or list of tests to be executed. Next, the Management CPU 122 (or some other device, such as computer 110) generates one or more test packets containing any of various test patterns. The Management CPU 122 then configures packet-processing device 120 to create and/or forward and/or otherwise process the test packets, checks results of packet processing operations and prepares reports with test results.

As the packet-processing device 120 conducts the instructed test(s), the packet-processing device 120 sends test result information to the computer 110 (via Management CPU 122) regarding any number of tests performed to detect packet processing errors, such as for example, and without limitation, packet forwarding errors, packet error counts, bit error counts, general health and operational status information from the various ports, queues, buffers and memories of the packet-processing device 120, whether the processed packets and/or the packet-processing device 120 conform to a particular Ethernet (or other) network standard (e.g., maximum bit rate or packet rate transfer), ability of the packet processing device 120 to perform packet processing operations under stress, and so on. During or subsequent to any testing, the computer 110 can compile a performance log, then determine the fitness of the packet-processing device 120 based on the test information received, and either "pass" or "fail" the packet-processing device 120, or otherwise provide detailed error information to a technician or other user.

Figure 2:
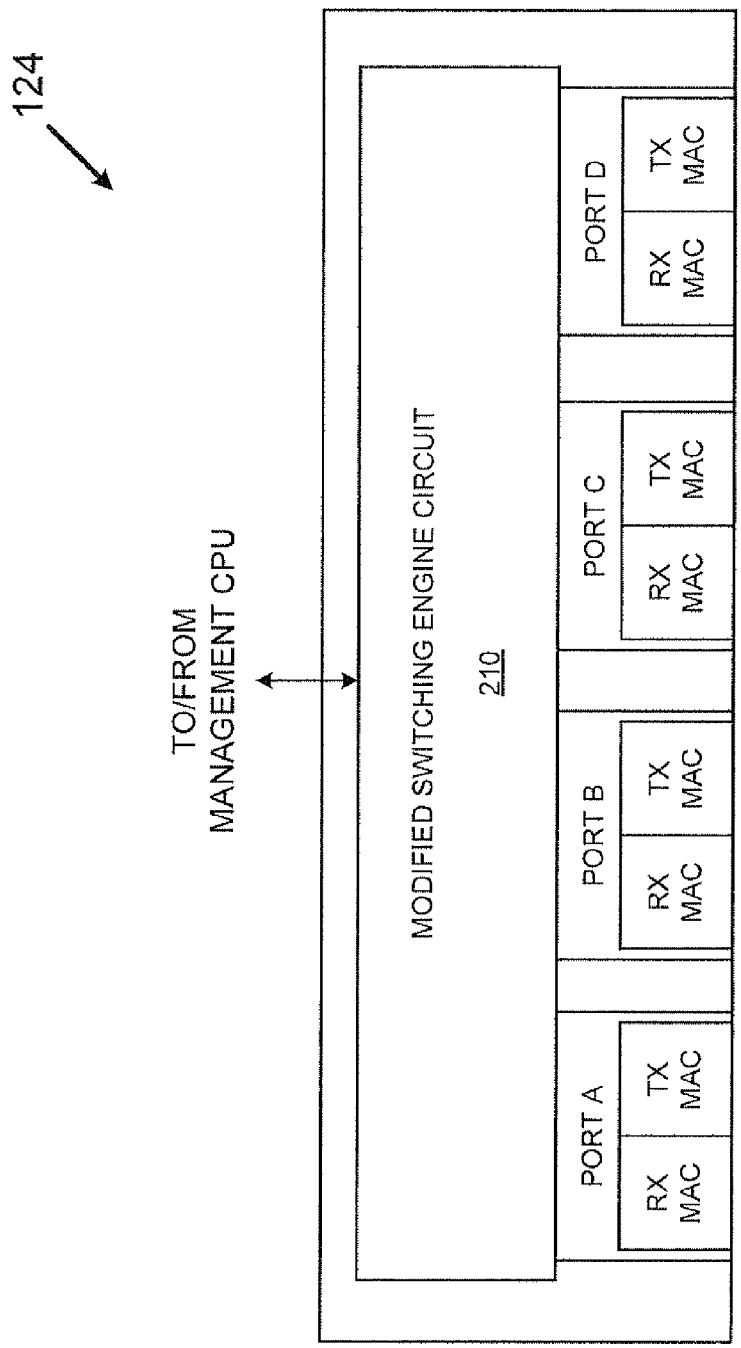
FIG. 2 is an example modified switching circuit capable of allowing self-testing with minimal external equipment for the packet processing device of FIG. 1.

FIG. 2 is the modified switching circuit 124 of FIG. 1, which enables self-testing of the packet-processing device 120 using minimal external equipment. As seen in FIG. 2, the modified switching circuit 124 includes a modified switching engine circuit 210 and a number of ports (PORT A . . . PORT D) with each port (PORT A . . . PORT D) including a receive media access controller (RX MAC) and a transmit media access controller (TX MAC). While the modified switching circuit 124 is derived from an application specific integrated circuit (ASIC), it is noted that the modified switching circuit 124 may be formed from any number of electronic and/or optical technologies as may be found necessary or advantageous.

As will be seen below, any of the plurality of ports (PORT A . . . PORT D) is configurable to allow a TX MAC to loop-back packets to a respective RX MAC at the MAC level. In various embodiments, this may occur between a TX MAC and RX MAC of the same port or of different ports.

In accordance with an embodiment, the switching engine circuit 210 is configured using various internal circuitry in such a way that the switching engine circuit 210 can transmit test packets to any TX MAC, and receive those test packet from the RX MAC that are looped-back by means of a loop-back coupling between a paired TX MAC and RX MAC of any given ports (PORT A . . . PORT D). Still other internal circuitry within the switching engine circuit 210 enables any received packet from any RX MAC to be forwarded to one or more the TX MACs of any or all of PORT A . . . PORT D.

Figure 3:
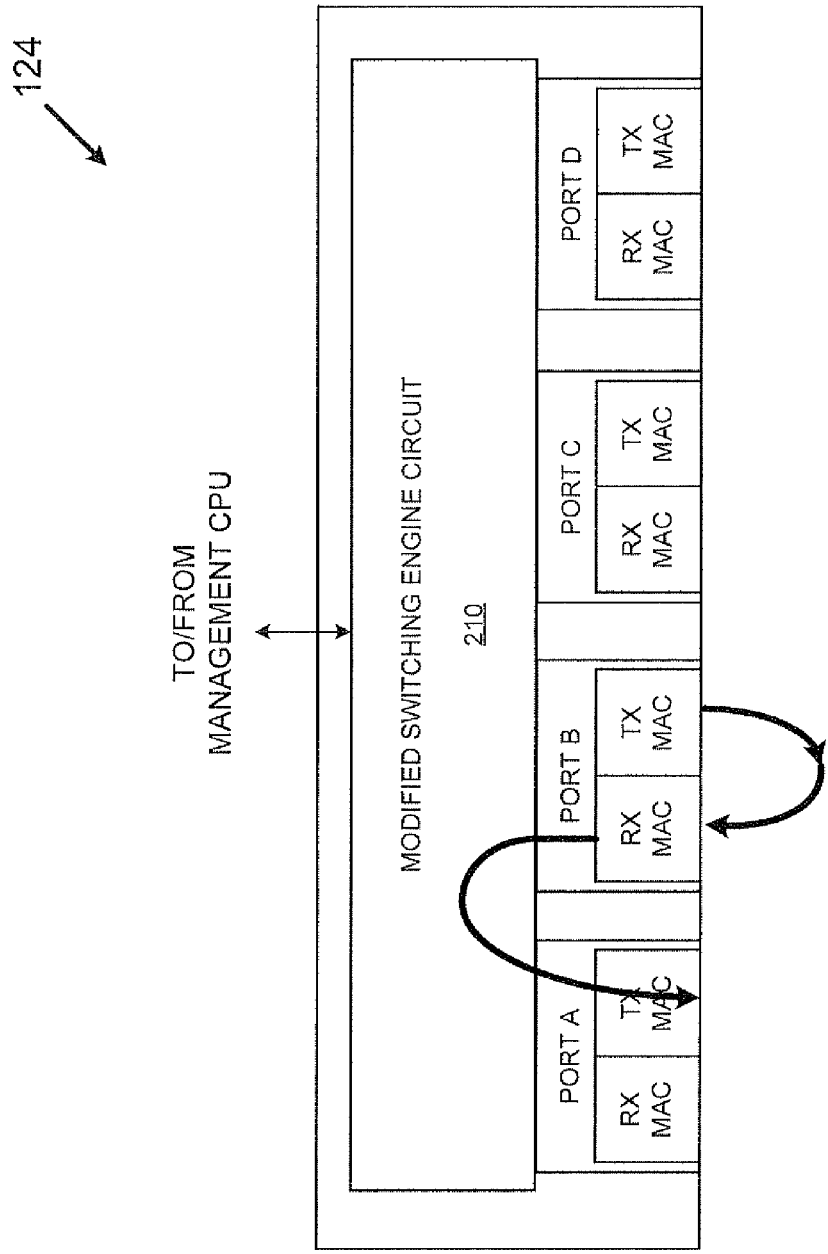
FIG. 3 depicts packet data flow in the modified switching circuit of FIG. 2 according to a first example test program.

FIG. 3 depicts packet data flow according to a first example test program. In this example, the switching engine circuit 210 and the various ports (PORT A . . . PORT D) are assumed to be configured by the Management CPU 122 of FIG. 1 according to a test protocol to test for single test packet.

In operation, a test packet containing a desired pattern is sent to the TX MAC of PORT B, which in turn is looped-back from the TX MAC to the respective RX MAC. The looped-back test packet is then received by the switching engine circuit 210 to be forwarded to the TX MAC of PORT A. During this time, the switching engine circuit 210 and the various TX MACs and RX MACs can perform error detection and monitor overall performance, where after the error and performance data is provided to an external device, such as the computer 110 of FIG. 1.

In the present embodiment, the test packet and the desired pattern within are generated by the management CPU 122. However, in other embodiments, the test packet and/or the desired pattern within may be generated by the computer 110 or any other external or internal device capable of producing bit-patterns and/or test packets.

Figure 4:
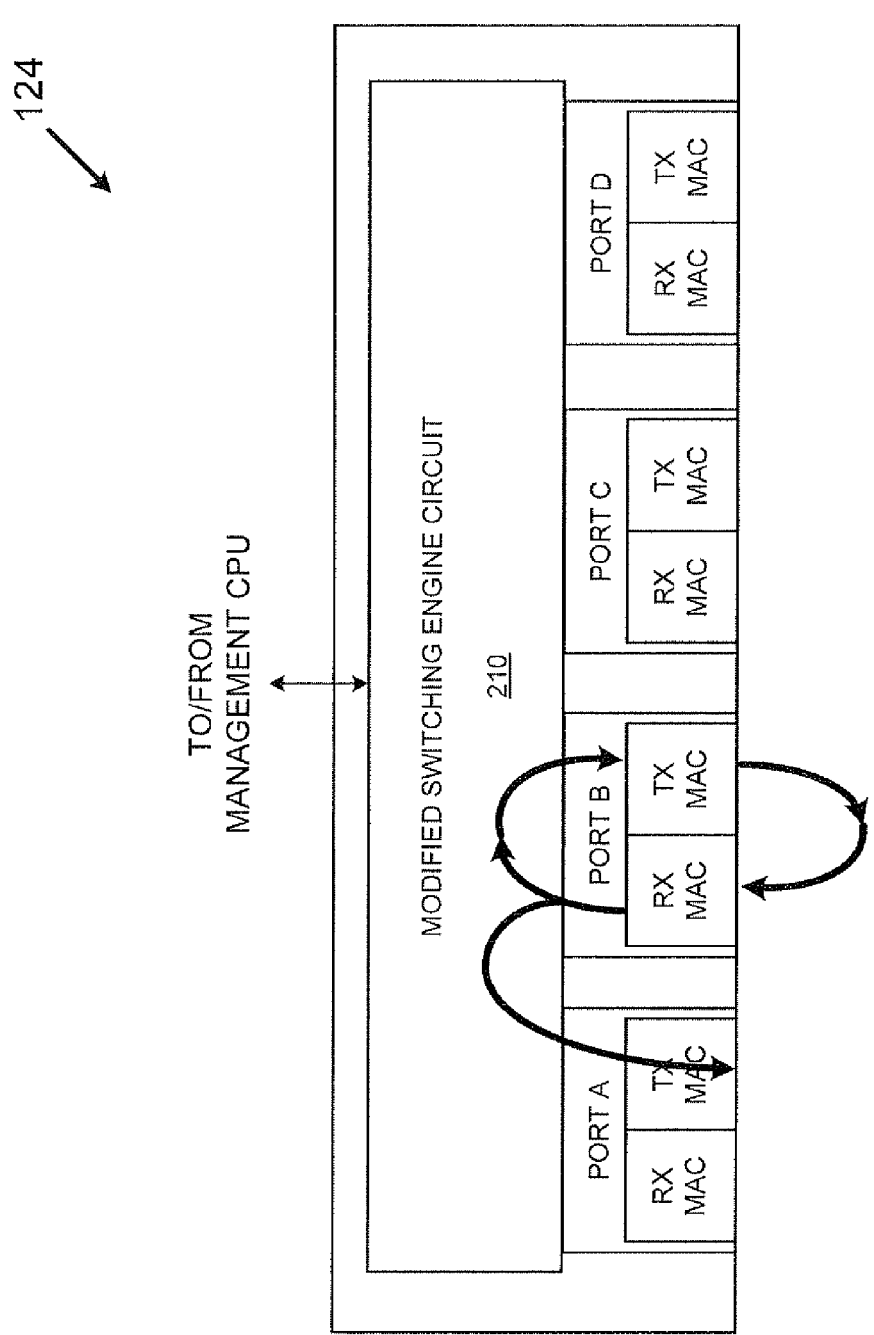
FIG. 4 depicts packet data flow in the modified switching circuit of FIG. 2 according to a second example test program.

FIG. 4 depicts packet data flow according to a second example test program. In this example, the switching engine circuit 210 and the various ports (PORT A . . . PORT D) again are assumed to be configured by the Management CPU 122 of FIG. 1 according to a test protocol to test for continuous packet traffic.

In operation, a test packet containing a desired pattern is sent to the TX MAC of PORT B, which in turn is looped-back from the TX MAC to the RX MAC with which it is coupled. In the example seen, the TX MAC is loop-back coupled to the RX MAC of the same port, although in other embodiments this need not be the case. The looped-back test packet is then received by the switching engine circuit 210 where it is forwarded to the TX MAC of PORT A.

In an embodiment, simultaneously, the looped-back test packet received from the RX MAC of PORT B is "mirrored" (i.e., effectively replicated), and the mirrored/copied version of the test packet is returned back to the TX MAC of PORT B. Accordingly, the switching engine circuit 210 and PORT B create a "storming operation" to allow a plurality of like test packets to be generated and routed to the TX MAC of PORT A or any of the other ports PORT C and/or PORT D. In an embodiment, the "storming operation" can be used to generate an increased volume of test packets, respective of a volume of test packets received from a packet generator (e.g., computer 110 or the Management CPU 122), which can be used to place the packet processing device 120 (FIG. 1) under an operational stress. In an example, the storming operation is used to test the ability of packet processing device to correctly process an increased volume of packets and/or to simultaneously perform multiple simultaneous independent packet processing operations, such as forwarding and mirroring. During this time of continuous simulated traffic, in an embodiment, the switching engine circuit 210 and the various TX MACs and RX MACs perform error detection and monitor overall performance, where after the error and performance data is provided to an external device, such as the computer 110 of FIG. 1.

Figure 5:
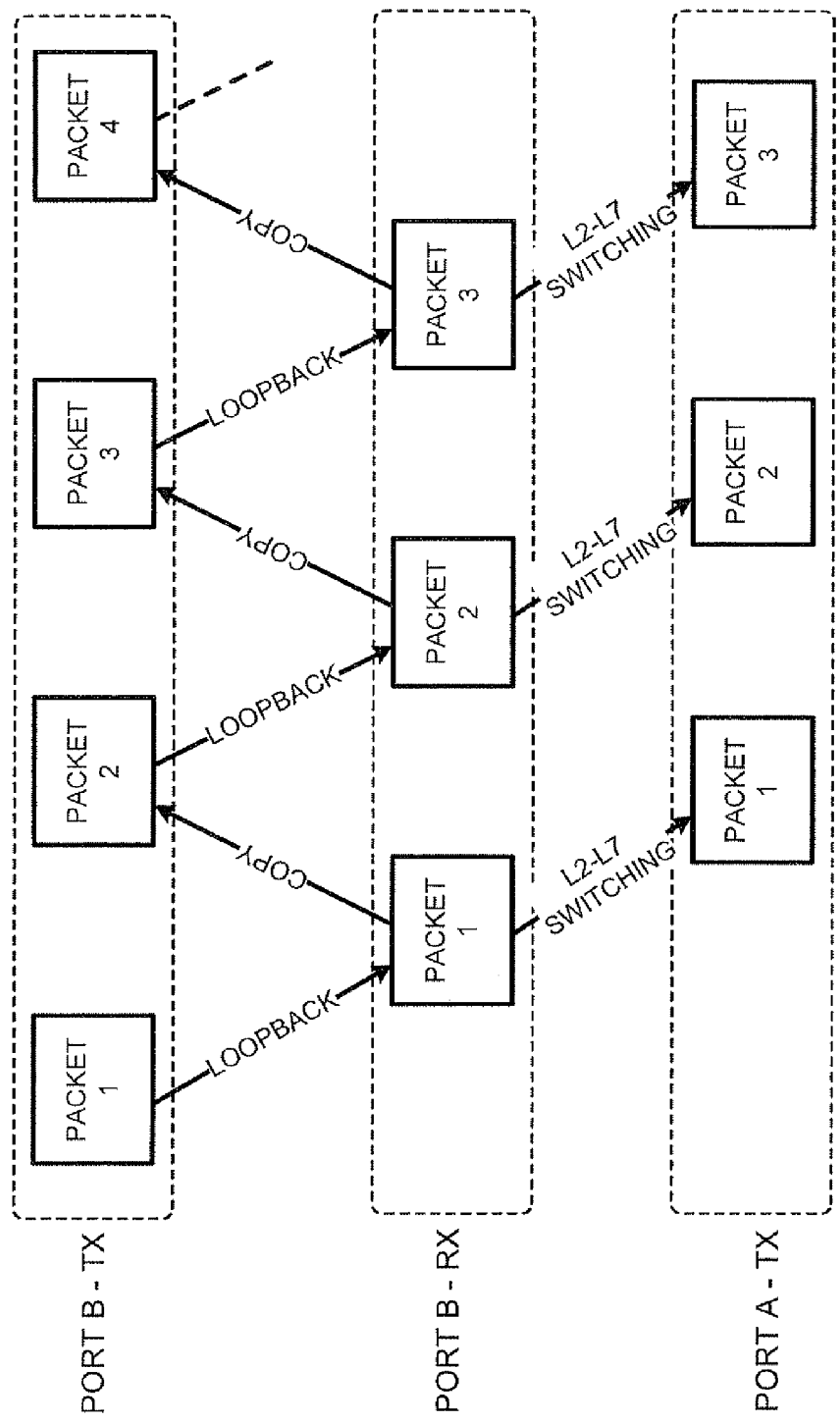
FIG. 5 depicts packet generation and mirroring using the second example test program.

FIG. 5 depicts packet generation and mirroring/copying using the second example test program of FIG. 4, in an embodiment. As seen in the top half of FIG. 5, there is a continuous pattern of loopback operations from the TX MAC of PORT B, and mirroring/copying operations that occur within the switching engine circuit 210. As seen in the bottom half of FIG. 5, there are also switching operations (which in various embodiments can effectively occur at any or all of Level 2 through Level 7 network layers) whereby continuously generated packets are fed to the TX MAC of PORT A.

Figure 6:
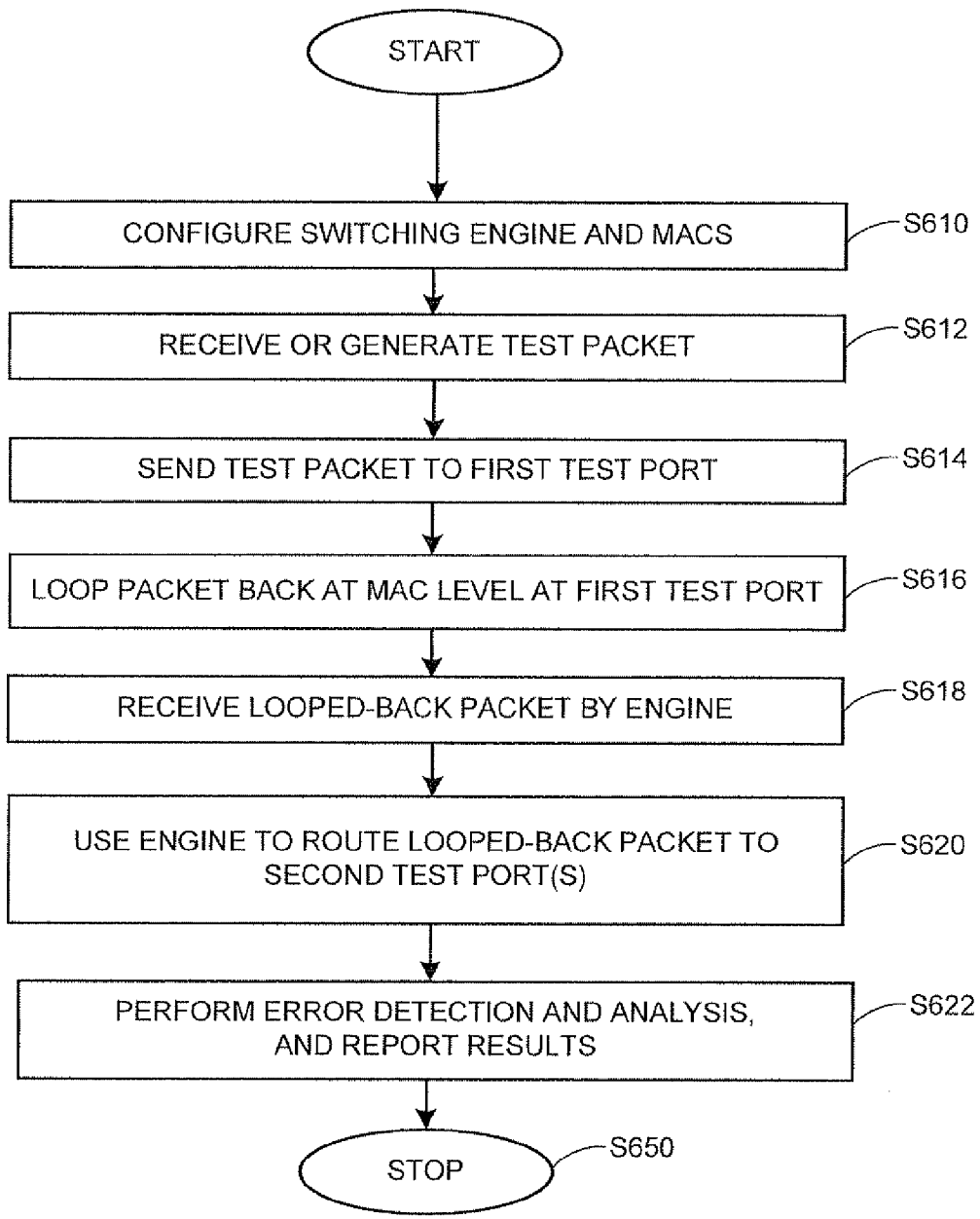
FIG. 6 is a flowchart outlining an operation of the disclosed methods and systems for testing the packet-processing device of FIG. 1.

FIG. 6 is a flowchart outlining an operation of the disclosed methods and systems for testing the packet-processing device of FIG. 1. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S610 where a switching engine circuit of a packet processing apparatus, such as the packet processing device 120 of FIG. 1, is configured. During this step, the TX MACs and RX MACs for various ports are also configured to perform loopback operations from TX MAC to RX MAC. Next, in step S612, a test packet is received or generated from received information. Then, in step S614, the test packet of step S612 is sent to the TX MAC of a first port. Control continues to step S616.

In step S616, the test packet is looped-back from the TX MAC of the first port to the RX MAC of the first port, in an embodiment. Next, in step S618, the looped-back packet is received from the RX MAC of the first port by the switching engine circuit. Then, in step S620, the switching engine circuit routes the received looped-back test packet to one or more second ports. Control continues to step S622.

In step S622, error detection and analysis are performed by the various MACs and by the switching engine circuit, and the results of the error detection and analysis are reported to an external device, such as a general purpose computer. Control then continues to step S650 where the process stops.

Figure 7:
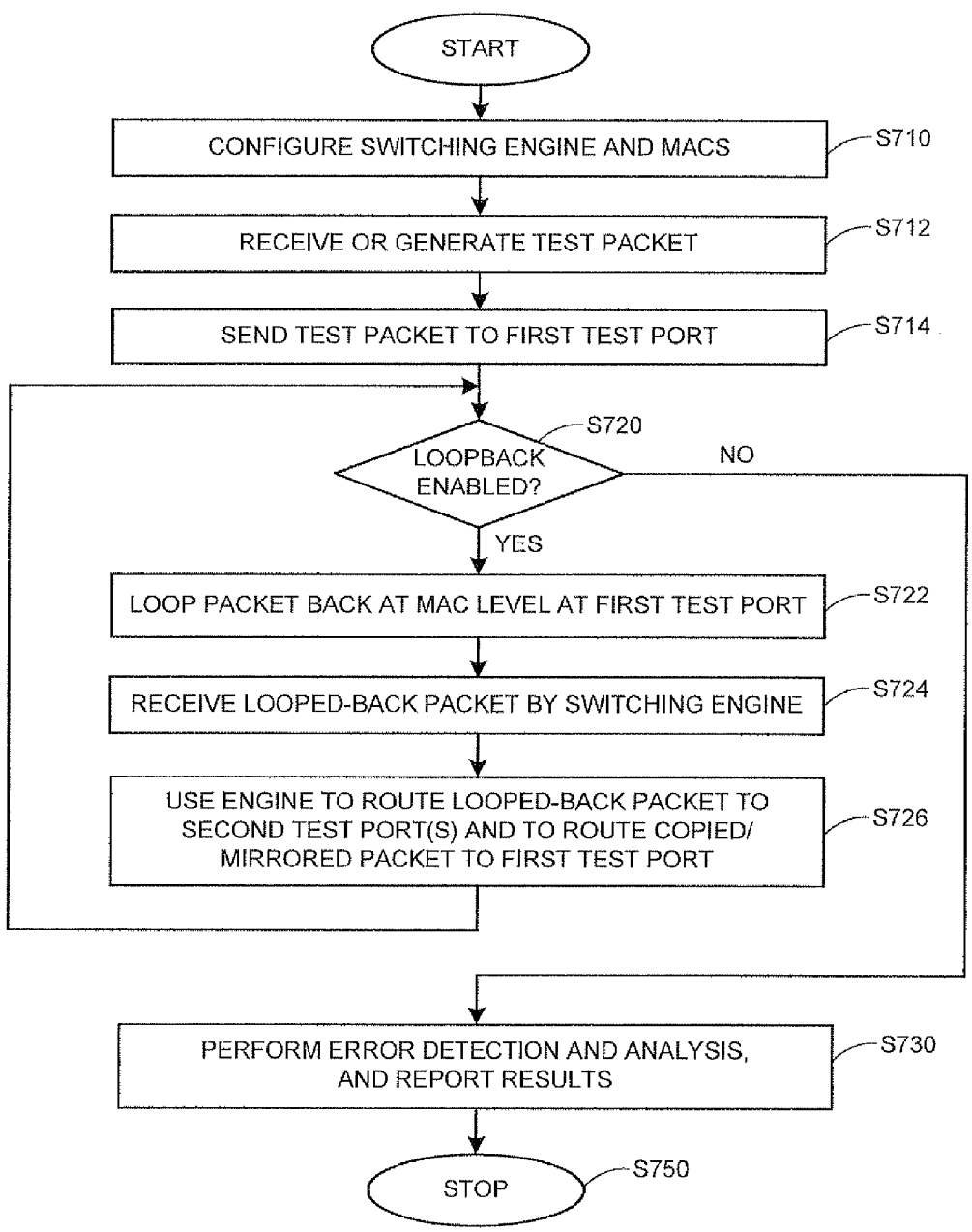
FIG. 7 is a flowchart outlining a second operation of the disclosed methods and systems for testing the packet-processing device of FIG. 1.

FIG. 7 is a flowchart outlining a second operation of the disclosed methods and systems for testing the packet-processing device of FIG. 1. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts in step S710 where a switching engine circuit of a packet processing apparatus, such as the packet processing device 120 of FIG. 1, is configured. During this step, the TX MACs and RX MACs for various ports are also configured to perform loopback operations from TX MAC to RX MAC. Next, in step S712, a test packet is received or generated from received information. Then, in step S714, the test packet of step S712 is sent to the TX MAC of a first port. Control continues to step S720.

In step S720, a determination is made as to whether loopback testing is enabled. If loopback testing is enabled, control continues to step 722; otherwise, control jumps to step 730.

In step S722, the test packet is looped-back from the TX MAC of the first port to the RX MAC of the first port. In an embodiment, this is performed at the MAC level, although the loopback may be, otherwise, for example, by way of physical coupling. Next, in step S724, the looped-back packet is received from the RX MAC of the first port by the switching engine circuit. Then, in step S726, the switching engine circuit forwards the received looped-back test packet to TX MACs of one or more second ports while simultaneously forwarding a mirrored/copied version of the test packet back to the TX MAC of the first port. Control then jumps back to step S720 where steps S722-S726 may be repeated (to effectively create a storming operation to produce a stream of continuous packets) as many times as may be required or otherwise desirable, i.e., until loopback testing is no longer enabled.

In step S730, error detection and analysis are performed by the various MACs and by the switching engine circuit, and the results of the error detection and analysis are reported to an external device, such as a general purpose computer. Control then continues to step S750 where the process stops.

The techniques and devices described herein may be implemented by various means. For example, the disclosed techniques may be implemented in hardware, software, or a combination thereof. For a hardware implementation, the various devices performing various processes within one or more application specific integrated circuits (ASICs), digital signal processors (DSPs), programmable logic, field programmable gate arrays (FPGAs), processors, controllers, micro-controllers, microprocessors, other electronic units designed to perform the functions described herein, or a combination thereof.

In various software implementations, the techniques described herein may be implemented with modules (e.g., procedures, functions, and so on) that perform the functions described herein. One or more forms of software code may be stored in one or more memory units and executed by one or more processors. Memory units may be implemented within a processor or external to the processor, in which case it can be communicatively coupled to the processor via various means.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A packet-processing device, comprising:
   a plurality of ports having a receive media access controller (RX MAC) and a transmit media access controller (TX MAC), wherein the TX MAC of a first port is selectably configurable to loop back packets to a RX MAC of the first port during a self-testing operation of the packet processing device; and
   a switching engine coupled to the plurality of ports, the switching engine being configured to:
      provide a test packet received from a packet generator to the TX MAC of the first port, and
      forward to the TX MAC of one or more second ports at least the test packet received from the RX MAC of the first port, or a copy of the received test packet, after the received test packet or its copy has been looped-back one or more times between the TX MAC of the first port and the RX MAC of the first port.

2. The packet processing apparatus of claim 1, wherein the switching engine further includes:
   packet mirroring circuitry configured to make a copy of the looped-back test packet received from the RX MAC of the first port, then route the copied test packet to the TX MAC of the first port.

3. The processing apparatus of claim 2, wherein the switching engine is configured to receive newly generated packets from the packet generator while looping-back previously received packets, or copies of the previously received packets, so that a volume of packets processed at the first port exceeds a volume of newly generated packets received from the packet generator.

4. The processing apparatus of claim 1, wherein at least two ports among the plurality of ports include a TX MAC that is selectably configurable to loop back packets to its respective RX MAC during a self-testing operation of the packet processor while continuing to receive test packets from the packet generator.

5. The processing apparatus of claim 1, wherein the switching engine circuit further includes analysis circuitry configured to detect packet processing errors caused by the plurality of ports during a self-test operation.

6. The processing apparatus of claim 5, wherein the apparatus further comprises a management central processing unit (CPU) that configures the switching engine circuit based on commands from an external computer.

7. The processing apparatus of claim 6, wherein the management CPU provides patterns for one or more test packets to be used for self-testing.

8. A method for testing a packet-processor that includes a plurality of ports having a receive media access controller (RX MAC) and a transmit media access controller (TX MAC), the method comprising:
sending a test packet to the TX MAC of a first port;
looping-back the test packet from the TX MAC of the first port to an RX MAC of the first port;
receiving the looped-back test packet from the RX MAC of the first port; and
routing the received looped-back test packet to a TX MAC of one or more other ports of the packet-processor.

9. The method of claim 8, further comprising replicating the received looped-back test packet received from the RX MAC of the first port, then routing at least one of the received looped back test packet and the replicated test packet to the TX MAC of the first port to increase a volume of packets and to route a plurality of like test packets to the TX MAC of one or more second ports.

10. The method of claim 9, wherein replicating the received looped-back test packet comprises replicating the packet at a packet mirror circuit of the packet processor.

11. The method of claim 9, wherein looping-back the test packet from the TX MAC of the first port to the RX MAC of the first port occurs at the MAC level.

12. The method of claim 9, further comprising detecting one or more packet processing errors that occur during packet transfer by at least one of the plurality of ports during self-testing.

13. The method of claim 12, further comprising providing test patterns for the test packets based on one or more commands received from an external computer.

14. A chipset for implementing a packet-processing apparatus configured to perform self-testing, comprising:
one or more integrated circuits that include:
a plurality of ports having a receive media access controller (RX MAC) and a transmit media access controller (TX MAC), wherein the TX MAC of a first port is selectably configurable to loop back packets to a RX MAC of the first port during a self-testing operation of the packet processor; and
a switching engine coupled to the plurality of ports, the switching engine being configured to:
provide a test packet received from a packet generator to the TX MAC of the first port, and
forward to the TX MAC of one or more second ports at least the test packet received from the RX MAC of the first port, or a copy of the received test packet, after the received test packet or its copy has been looped-back one or more times between the TX MAC of the first port and the RX MAC of the first port.

15. The chipset of claim 14, wherein the switching engine circuit further includes:
second circuitry so as to enable the switching engine circuit to replicate the looped-back test packet received from the RX MAC of the first port, then route the replicated test packet to the TX MAC of the first port.

16. The chipset of claim 15, wherein the first circuitry and the second circuitry enable the switching engine circuit and the first port to create a storming operation to allow a plurality of like test packets routed to the TX MAC of one or more second ports.

17. The chipset of claim 16, wherein each TX MAC is configurable during self-testing to loop back packets to its respective RX MAC.

18. The chipset of claim 14, wherein the switching engine circuit further includes analysis circuitry configured to detect packet processing errors that occur during self-testing.

19. The chipset of claim 14, further comprising pattern generating circuitry that provides patterns for one or more test packets to be used for self-testing.

20. A method for testing a packet-processor that includes a plurality of ports having a receive media access controller (RX MAC) and a transmit media access controller (TX MAC), the method comprising:
sending a test packet to the TX MAC of a first port;
looping-back the test packet from the TX MAC of the first port to an RX MAC;
receiving the looped-back test packet from the RX MAC; and
replicating the received looped-back test packet received from the RX MAC, then routing at least one of the received looped-back test packet and the replicated test packet to the TX MAC of the first port to increase a volume of packets and to route a plurality of like test packets to the TX MAC of one or more other ports of the packet-processor.

* * * * *